Figure 1:
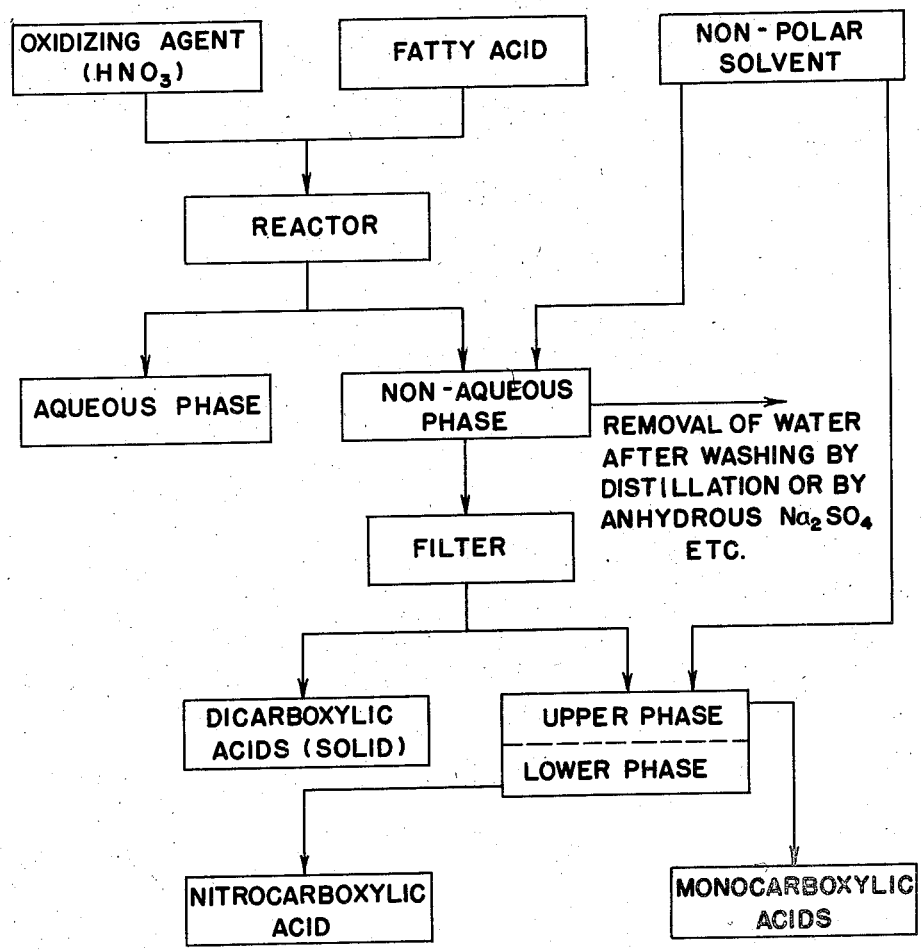

FIG. I

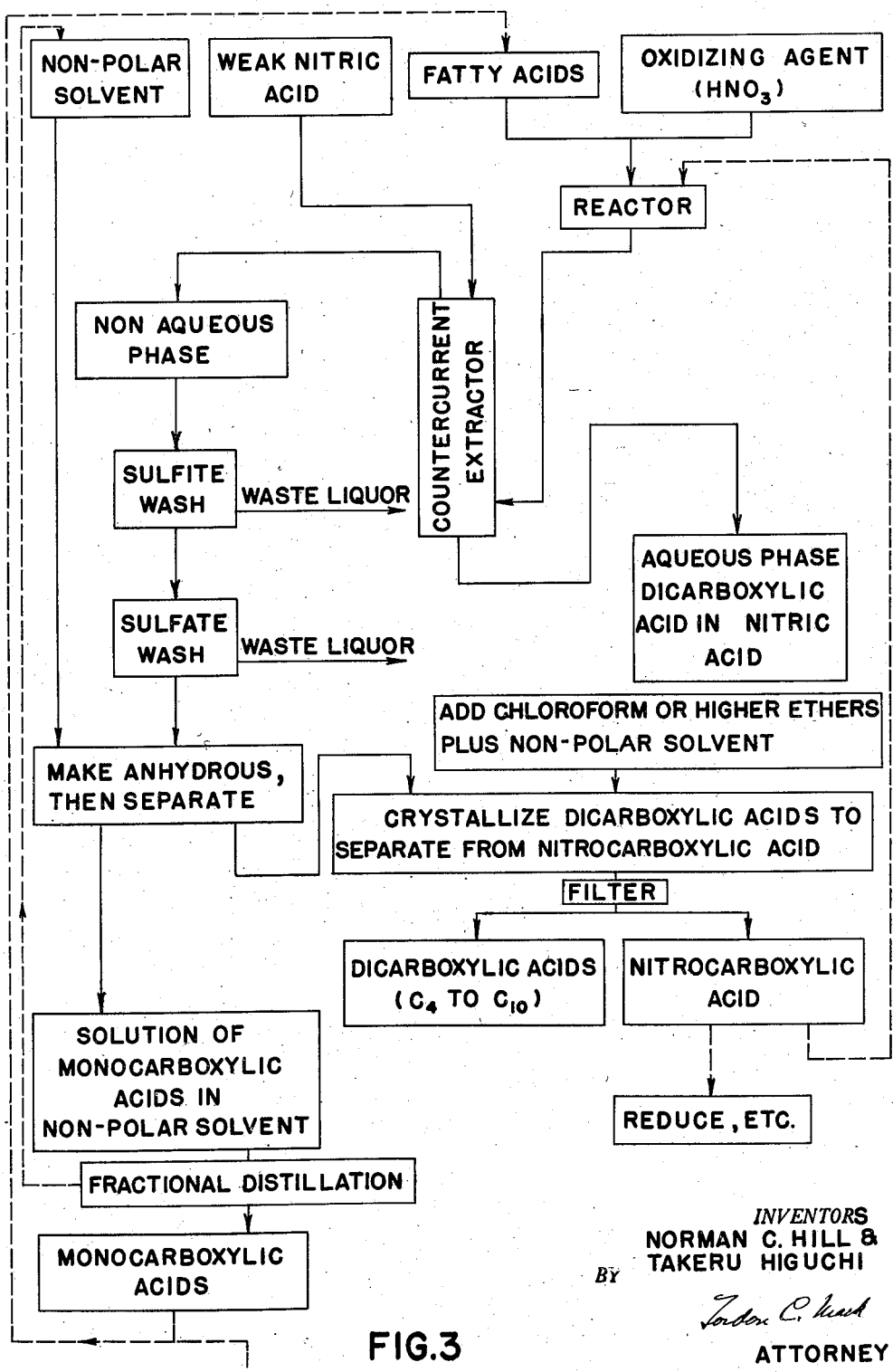

United States Patent Office 2,841,601
Patented July 1, 1958

2,841,601

SEPARATION OF DICARBOXYLIC AND MONOCARBOXYLIC ACIDS

Norman C. Hill, Akron, Ohio, and Takeru Higuchi, Madison, Wis., assignors to The C. P. Hall Company, Akron, Ohio, a corporation of Ohio Application May 24, 1955, Serial No. 510,769

8 Claims. (Cl. 260—404)

This invention relates to the production and treatment of carboxylic acids. More particularly it relates to the preparation and separation of various carboxylic acids or groups of carboxylic acids, especially from oxidation products obtained by the oxidation with aqueous nitric acid of fatty acids and other saturated and unsaturated cyclic and acyclic aliphatic hydrocarbons and oxygen-containing derivatives thereof which contain at least four carbon atoms linked by single bonds in a straight chain.

In the oxidation, nitrogen-containing carboxylic acids are produced which are called herein "nitrocarboxylic acids" whether derived from a monocarboxylic acid or a dicarboxylic acid.

Dicarboxylic acids (also called alkanedioic acids herein), monocarboxylic acids, and nitrocarboxylic acid are produced in the oxidation. The invention relates to separation of the acids of these various classes.

Monocarboxylic acids formed by the oxidation may be volatilized from the reaction mixture during the oxidation, and on recovery from the distillate they may be added to a selected portion of the unvolatilized reaction product for treatment therewith. Thus products or by-products obtained at different steps of the operation, may be combined for conjoint treatment.

A particularly desirable source material is an animal or vegetable fatty acid, and a monoethenoic fatty acid such as oleic acid is preferred. Fatty acids low in rosin acids from tall oil, acidulated foots from cottonseed and soyabean, etc., as well as fatty acids from animal oils, grease, etc., form particularly desirable source materials. Other fatty acids that may be used include those from linseed oil, castor oil, cocoanut oil, lard oil, peanut oil, sunflower seed oil, rapeseed oil, mustardseed oil, safflower oil, red oil, fish oil, fishliver oil, etc., although polyethenoic fatty acids are not generally preferred because they give lower yields. Fatty acids from the foregoing latter sources react chemically as indicated, but they are usually too expensive to be used economically in this process. Cheaper fatty acids will ordinarily be employed even though they have a high content of linoleic acid. The glyceride and glycerine content should be low. Petroleum hydrocarbons may be employed. Synthetic source materials may be employed, such as saturated and unsaturated cyclic and acyclic hydrocarbons and oxygenated derivatives thereof, including hydroxy and keto compounds (e. g. 9,10-octadecanediol, etc.), and cyclic hydroxy and keto compounds, such suitable synthetic sources being mixtures of such compounds constituting Oxo process residues and Fischer-Tropsch process oxygenated chemical residues.

Aqueous nitric acid is used in the oxidation and may be used alone or with air, oxygen, ozone, etc. Oxides of nitrogen such as $NO_2$, $N_2O_4$ and other oxides above $N_2O$ may be used and in aqueous solutions in the presence of air produce some nitric acid. Nitric acid and these oxides of nitrogen form desirable oxidizing agents because they leave no inorganic residue. The inorganic nitrogen-containing compounds present after oxidation may easily be separated by volatilization. Metal compounds derived from catalysts may be separated in any convenient manner.

The reaction may be carried out in a single phase, but is preferably carried out in two phases, one of which is water-poor and will be referred to herein as the "non-aqueous phase" to contrast it with the other phase which is termed the aqueous phase.

The oxidation products susceptible to the treatment of this invention are the less polar carboxylic acids from which more polar carboxylic acids have been separated by water solution. These less polar acids which constitute the non-aqueous phase of the oxidation product include monocarboxylic acids and dicarboxylic acids of higher molecular weight, and nitrocarboxylic acid.

Monocarboxylic acids produced during the reaction constitute the non-aqueous phase together with some of the dicarboxylic acid produced in the reaction. Some of the monocarboxylic acids are dissolved into the aqueous phase. Nitrocarboxylic acid will be found in the non-aqueous phase and also in the aqueous phase.

The non-aqueous phase, coming from the reaction, is preferably washed free from the oxidizing agent, and the non-aqueous phase, substantially freed from the water, is extracted with a non-polar solvent which dissolves the monocarboxylic acids. The dicarboxylic acids and nitro-carboxylic acid are relatively insoluble in the non-polar solvent.

The non-polar solvent is subsequently separated from the monocarboxylic acids by distillation. The monocarboxylic acids may then be added to the source material and subjected to further oxidation, but before doing so, any valuable monocarboxylic acid or acids may be separated from the remaining less valuable monocarboxylic acids, as by fractional distillation for eventual esterification or other use. It is only the less valuable monocarboxylic acids which are returned to the source material for oxidation to dicarboxylic acids.

The mixture of the dicarboxylic acids and the nitrocarboxylic acid which is not dissolved into the non-polar solvent may be separated in any desirable manner. The nitrocarboxylic acid may then be reduced to amino compounds or otherwise utilized. All or a part of the nitrocarboxylic acid may be returned as source material or otherwise subjected to further oxidation and the production of dicarboxylic acids therefrom.

The invention will be described more particularly as applied to the treatment of a fatty acid such as oleic acid with nitric acid. In such processes, the oxidation is preferably carried out in the presence of air, or oxygen-enriched air, or various other oxidizing agents. One mole of oleic acid yields one mole of dicarboxylic acid and one mole of a monocarboxylic acid, but with nitric acid the two portions of the chain formed by scission of the oleic acid molecule are converted to dicarboxylic acid instead of just one part as is the case with many other methods of oxidation. Nitrocarboxylic acid is normally found in the reaction mixture. The chain lengths of the reaction products are dependent upon the time, temperature and pressure of the reaction, as well as the concentration of the nitric acid employed, etc. The effect of pressure is marked, since higher pressures cause greater solution of the oxides of nitrogen in the reaction mixture.

If the starting material is a polyethenoic fatty acid, such as linoleic or linolenic acid, then the indicated reaction takes place at each double bond and splits the molecule into a number of fragments, largely determined by the number of double bonds in the source material. Fragments of three carbons or less are oxidized to carbon dioxide and water and are hence lost to the process.

Saturated acids are subject to random attack, and, since stearic acid gives approximately the same yield of final products as oleic acid, it is apparent that the nitric acid or oxides of nitrogen employed for oxidation do not produce fragments which are generally shorter than 4-carbon atoms, nor do they generally cut off carbon chains in groups of two, as taught by Challenor and Thorpe, J. Chem. Soc., 123, 2480–85 (1923).

The invention will be described with reference to the accompanying flow sheets, but it is to be understood that the examples are illustrative and the process is not limited thereto.

During the reaction as illustrated in the flow sheets, there are generally two phases in the reactor. The aqueous phase contains the oxidizing agent and a portion of the dicarboxylic acids produced.

The non-aqueous phase includes any unreacted source material and much of the monocarboxylic acids produced during the reaction, as well as some of the dicarboxylic acids, and nitrocarboxylic acid. Also, any long-chain aldehyde obtained by partial oxidation of the source material, or less polar nitrocarboxylic acid produced will be dissolved into the non-aqueous phase. Aldehydes are so readily oxidized by nitric acid that they are never present in appreciable quantities when the starting material is oxidized in this manner, although they are present in other oxidation products.

After separation of the two phases, the non-aqueous phase is preferably washed with an aqueous reducing agent, such as concentrated sodium hydrogen sulphite (or sodium sulphite or potassium hydrogen sulphite, etc.), to form a complex with any aldehyde present and to reduce any excess oxidizing agent present. This wash may be repeated several times, if needed. Then, instead of washing with water, which has about the same gravity as the non-aqueous phase, it is preferable to wash with an aqueous solution of an inert salt, which solution has a higher gravity than 1.05 or 1.10, such as sodium sulphate, potassium sulphate, etc., to remove the reducing agent. Each wash may be repeated a number of times.

The wash water from such washing operations is carefully separated from the non-aqueous phase. Any water remaining would be dissolved to some extent in the non-polar solvent with which this reaction product is subsequently treated and increase its polarity and thus reduce its power of resolving the monocarboxylic acids and dicarboxylic acids.

There are two general methods of dehydrating the non-aqueous phase. First, the non-polar solvent may be added and then by distillation the water is removed with some of the solvent. (See Fig. 1.) Second, the addition of a mild dehydrating agent such as anhydrous sodium sulfate, etc. (See Fig. 2.)

In the extraction of the non-aqueous phase with the non-polar solvent, any suitable mixing or extracting equipment may be employed. The monocarboxylic acids are dissloved into the non-polar solvents. The dicarboxylic acids are substantially insoluble in such solvents. The nitrocarboxylic acid also is substantially insoluble in non-polar solvents. Thus the dicarboxylic acids are obtained either before or after the separation of the nitrocarboxylic acid from the monocarboxylic acid by the addition of non-polar solvent.

By non-polar solvent is meant organic solvents which possess little or no polar characteristics. These liquids are usually characterized by very low dielectric constants and highly hydrophobic tendencies. Among solvents which can be used alone or in mixtures are propane, butane, isobutane, pentanes, hexanes, heptanes, octanes, etc. Although they are not commercially feasible presently because of their high costs, fluorinated hydrocarbons can also be used. Because of their ready availability and low polarity, the lower aliphatic hydrocarbons either as relatively pure fractions or as mixtures are particularly suitable. Butanes and pentanes are especially recommended because they are easily removed from the fractions and because they tend to precipitate the components more readily than the higher boiling hydrocarbons.

Any nitrocarboxylic acid present may be thrown out of the solution with the dicarboxylic acids and the two may be separated subsequently, or the nitrocarboxylic acid may be retained in a dissolved state with the solution of the monocarboxylic acids, the dicarboxylic acid first separated by filtration, then by the addition of more non-polar solvent the nitrocarboxylic acid separates from the monocarboxylic acid as a separate, lower liquid phase.

These different procedures are illustrated by the two flow sheets (Figures 1 and 2) which constitute a part of the disclosure of this invention. It will be observed that, except for the different procedures of separating the nitrocarboxylic acid, the processes of the two flow sheets involve essentially the same procedural steps. Both involve the solution of monocarboxylic acids out of the non-aqueous phase into the non-polar solvent, with consequent precipitation and thus separation of the dicarboxylic acids, as well as the separation of the nitrocarboxylic acid as a separate liquid phase.

The solvent present in the resulting solution is distilled from the monocarboxylic acids (and also from any nitrocarboxylic acid present), and is advantageously returned to the process for reuse as solvent.

To illustrate: In nature, we find saturated monocarboxylic acids which comprise an even number of carbon atoms (such as $C_{12}$, $C_{14}$, $C_{16}$, and $C_{18}$) as well as unsaturated even-carbon number acids. In this process we produce odd-numbered carbon acids (such as $C_5$, $C_7$, $C_9$, $C_{11}$, etc.) as well as even-numbered monocarboxylic acids ($C_4$, $C_6$, $C_8$, $C_{10}$, and $C_{12}$, etc.). One or more of these odd-numbered acids may, for example, be separately recovered and disposed of, in any required state of purity, as by fractional distillation, fractional crystallization, etc., and the more plentiful even-numbered acids may be returned to the process for further oxidation. Some of the even-numbered acids which are especially in demand, such as $C_4$ and $C_6$ may advantageously be separately recovered. The less valuable odd- and even-numbered acids will be reused in the process without any special separation or purification and be converted to dicarboxylic acids. They may be returnd directly to the reactor, or may be stored for eventual reuse.

Figure 2:
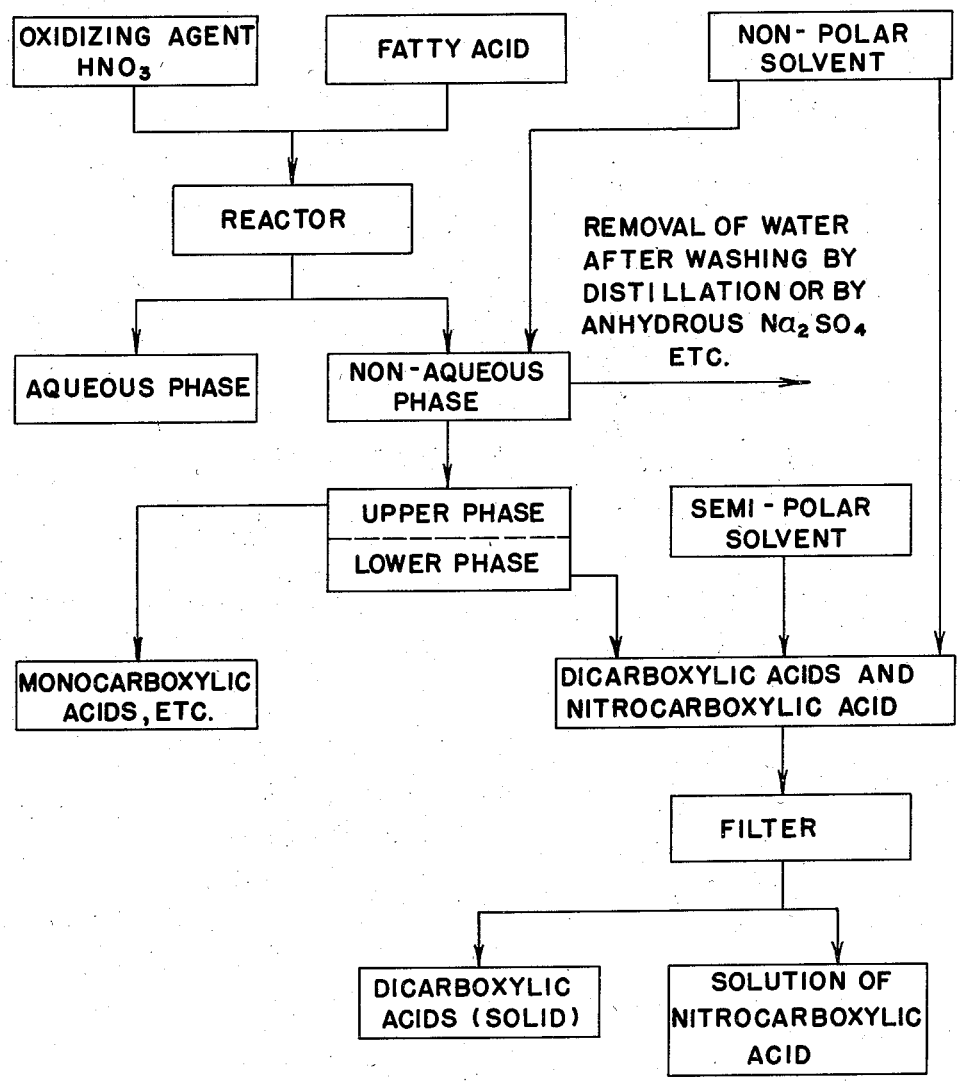

Figures 1, 2 and 3 are flow sheets illustrating different processes discussed herein.

The following example illustrates oxidation of a hydrocarbon:

EXAMPLE I 200 parts of paraffin hydrocarbon, of the range including n-decane and n-undecane were treated with 25.3% $HNO_3$ and air at 99° C. for a period of 70 hours. The dicarboxylic acids produced had the following analysis; 30.4 parts of dicarboxylic acid were produced:

| | |
|---|---|
| $C_4$ | 18.75 |
| $C_5$ | 14.51 |
| $C_6$ | 22.06 |
| $C_7$ | 22.15 |
| $C_8$ | 12.67 |
| $C_9$ | 3.99 |
| $C_{10}$ | 5.89 |

Besides the dicarboxylic acids there were produced also 30.0 parts monocarboxylic acids. The monocarboxylic acids had the following analysis:

| | Percent by weight |
|---|---|
| $C_4$ to $C_7$ | 50.65 |
| $C_8$ | 21.92 |
| $C_9$ | 22.85 |
| $C_{10}$ | 3.75 |
| $C_{11}$ and higher | 0.83 |
| | 100.00 |

Both analyses were determined by chromatographic methods. Unreacted paraffin hydrocarbon starting material amounted to 143 parts.

The reaction product is separated into two phases and the monocarboxylic acids in the non-aqueous phase are recovered, with or without nitrocarboxylic acid, following either of the procedures illustrated in flow sheets shown in Figs. 1 and 2, and described herein.

If the source material is largely fatty acid of 16 or more carbon atoms, the monocarboxylic acids produced will be largely $C_4$ to $C_{12}$ but may also contain unreacted source material. If the source material is an Oxo-process residue, the following example illustrates the process and the products:

EXAMPLE II 200 parts of Oxo process residue (high boiling fraction) having the following analysis:

| | Percent by weight |
|---|---|
| $C_8$ alcohols | 5.0 |
| $C_9$ alcohols | 5.0 |
| $C_{16}$ or higher alcohols | 40.0 |
| Ethers, carbonyls | 49.0 |
| Other compounds | 1.0 |
| | 100.0 | were oxidized, using 25% nitric acid as the oxidizing agent, at 110° C. for 16 hours, giving 40.4 parts of dicarboxylic acids of the following composition:

| | As Recovered | Calculated To Monocarboxylic Acid-Free Condition |
|---|---|---|
| | Percent | Percent |
| $C_4$ | 4.54 | 11.94 |
| $C_5$ | 7.27 | 19.12 |
| $C_6$ | 6.36 | 16.72 |
| $C_7$ | 6.43 | 16.91 |
| $C_8$ | 8.88 | 23.16 |
| $C_9$ | 3.22 | 8.47 |
| $C_{10}$ | 1.40 | 3.67 |
| Monocarboxylic Acid | 61.96 | |
| | 100.00 | 99.99 |

The 61.96 percent of monocarboxylic acid shown in column one, above, had the following composition:

| | Percent by weight |
|---|---|
| $C_6$ | 5.24 |
| $C_7$ | 8.05 |
| $C_8$ | 28.30 |
| $C_9$ | 9.46 |
| $C_{10}$ | 34.35 |
| $C_{11}$ and higher | 14.60 |
| | 100.00 |

The foregoing analyses were determined chromatographically. The dicarboxylic and monocarboxylic acids, together with the nitrocarboxylic acid distribute themselves between the aqueous and non-aqueous phases of the reaction mixture. The non-aqueous phase is treated for the solution of the monocarboxylic acids into non-polar solvent. Using a limited amount of non-polar solvent, the nitrocarboxylic acid remains dissolved in the non-aqueous phase and the dicarboxylic acids separate, as is illustrated in Fig. 1. If, however, more non-polar solvent is used, the nitrocarboxylic acid is left with the dicarboxylic acids and then separated, if desired, as described in connection with the operation shown in Fig. 2.

If the source material is Fischer-Tropsch process oxygenated chemical residues, the monocarboxylic acids will contain considerable branched-chain or substituted materials, their identity being dependent upon the chain length and substitution of the source material, the contact time, the concentration of the nitric acid, and the pressure and temperature at which the reaction has taken place, etc.

The oxidation reaction is ordinarily carried out under a condenser. At elevated temperatures, which are ordinarily employed in the oxidation, monocarboxylic acids are vaporized and condensed. The condensate, which includes monocarboxylic acids as well as dilute nitric acid and water, may be returned to the reaction mixture for conversion to dicarboxylic acids, or may be separately collected and disposed of in any desired manner.

In any of the oxidation processes described herein, part of the monocarboxylic acids produced in the reaction may be vaporized and collected as condensate, while a greater portion of the monocarboxylic acid is produced by scission of the larger molecules of starting material and this remains behind in the reactor as a large part of the non-aqueous phase. Unreacted starting material may also be found in the non-aqueous phase.

When the reaction product is withdrawn from the reactor, either continuously or at the end of the batch treatment, the monocarboxylic acid in the non-aqueous phase is recovered by the addition of non-polar solvent which separates the other components from the monocarboxylic acids.

An important constituent of the insoluble material precipitated from the non-aqueous phase of the reaction mixture on solution of the monocarboxylic acids into the non-polar solvent is dicarboxylic acids. Nitrocarboxylic acid which is formed may be precipitated with the dicarboxylic acids as illustrated on Fig. 2, or may be retained in solution and separated from the monocarboxylic acids by formation of a solution thereof immiscible with the solution of the monocarboxylic acids as illustrated on Fig. 1. There are various processes for resolving a mixture of dicarboxylic acids and nitrocarboxylic acid, as by solution of the nitrocarboxylic acid in water or an aqueous solution of controlled pH or by various solvents, etc. The recovered nitrocarboxylic acid may be reduced to amino acids or other amino compounds, or it may be returned to the process as source material for the production of dicarboxylic acids. Alternatively, the nitrocarboxylic acid may be separately oxidized to dicarboxylic acids.

Many of the nitrocarboxylic acid components produced in the oxidation of fatty acids, etc., with nitric acid may be entirely converted to dicarboxylic acids when boiled with water or aqueous nitric acid, but, in the absence of water or aqueous nitric acid they will form tars or pitches of little or no value. Only the primary nitro compounds produced by such reaction with nitric acid are hydrolyzed with sulphuric acid; the secondary and tertiary nitro-substituted compounds are converted to tars. The nitrocarboxylic acids may be reduced chemically or electrolytically to amino acids or other amino compounds.

The precipitated dicarboxylic acids may be separated and purified, etc., as desired. They may be converted to esters before or after separation from one another.

EXAMPLE III

As an example, using about 40% of source material (a mixture of cottonseed and soyabean acidulated foots) and 60% non-aqueous phase from a previous oxidation of like source material, using an equal volume of about 25% aqueous nitric acid, and blowing air through the reactor at the rate of 10 cu. ft. per min. (normal temperature and pressure), using a 250-gal. reactor operated at 110–130° C. at pressures ranging from 7 p. s. i. g. to 30 p. s. i. g. from about 8 to 36 hours (depending upon the temperature employed), adding nitric acid during the oxidation to maintain the concentration of nitric acid in contact with the fatty acids at about 25%, the total dicarboxylic acids produced have the following analysis:

Table 1

| | Acid | Percent |
|---|---|---|
| $C_4$ | Succinic | 11.65 |
| $C_5$ | Glutaric | 12.50 |
| $C_6$ | Adipic | 14.55 |
| $C_7$ | Pimelic | 16.00 |
| $C_8$ | Suberic | 25.87 |
| $C_9$ | Azelaic | 16.83 |
| $C_{10}$ | Sebacic | 2.50 |
| Total | | 99.90 |

In the oxidation of fatty acids, as much as 25% to 40% or more of monocarboxylic acid may be produced, the percentage varying, however, depending upon the source material, the time of contact, the concentration of acid employed, and the temperature and pressure of the reaction, etc.

The oxidation and separation of the various components of the reaction-mixture is illustrated in Fig. 3.

The non-aqueous phase from the oxidation reaction is given a wash with weak nitric acid, preferably in a countercurrent extractor, for recovery of a substantial part of the dicarboxylic acid product, and then a wash with sulfite, followed by washing with aqueous sodium sulfate or other water solution, which is sufficiently heavier than the non-aqueous phase to readily separate from it. The purpose of washing the non-aqueous phase is to recover dicarboxylic acids, particularly those which are soluble in the non-aqueous phase, to a greater degree, such as suberic acid, azelaic acid and sebacic acid.

In the example (in which the total dicarboxylic acids produced had the foregoing analysis), the aqueous (lower) phase of the oxidized reaction-mixture contained about 25% of dicarboxylic acids and had a specific gravity of 1.1375 at 60° C.

Although initially the non-aqueous phase in the reaction is composed largely of unreacted source material, as the oxidation progresses this is acted upon until ordinarily the non-aqueous phase is composed largely of by-product monocarboxylic acids containing 4 to 12 carbon atoms, this phase having a specific gravity of 0.995 to 1.005. In the ultimate non-aqueous phase in the example, there was dissolved a quantity of dicarboxylic acids ($C_4$ to $C_{10}$ and higher), the dicarboxylic acids being distributed between the two phases according to their distribution coefficients. Nitrocarboxylic acid was also present. The various components present in each phase appear to have a considerable effect upon the solubility of the homologues present and hence affect the distribution coefficients of the various components present.

Using nitric acid as the oxidizing agent, there is no considerable quantity of aldehydes present in the reactor at any one time, because the aldehydes which are formed during the scission are readily oxidized by the nitric acid. The tendency is for the aldehydes to be oxidized to carboxylic acids. Thus, half aldehydes will be oxidized to dicarboxylic acids.

Ketones, if present in the source material, are readily split by nitric acid oxidation at or near the keto-group because the carbonyl may be considered as going to hydroxyl and forming a double bond by borrowing a hydrogen from the adjacent methylene group. Thus either the hydroxyl or the double bond is reacted upon by nitric acid at elevated temperatures, and scission results. Hence, ketones in the reaction mixture produce the same type of end products as monocarboxylic acids.

In nitric acid oxidation, hydroxy acids, if present, are likewise readily oxidized at or near the hydroxy radical, and result in scission and formation of mono- and dicarboxylic acids. Thus, each phase of the reaction mixture is substantially free from aldehydes, ketones, and hydroxy acids.

In a batch operation the reaction mixture is usually allowed to settle in the reactor and the two phases are separately withdrawn. In a continuous operation, a mixture of the two phases is blown from the reactor, at intervals or continuously, in a stream and the two phases are separated in external separation apparatus.

The non-aqueous phase from the reacted mixture may be washed and extracted batchwise or continuously. The treatment may be carried out counter-currently. By extraction at a temperature preferably not above about 25° C. with a non-polar solvent, the less polar monocarboxylic acids are transferred to the solvent. Low temperatures are preferred to repress the solution of the dicarboxylic acids and nitocarboxylic acid, unless it is also desired to bring the nitrocarboxylic acid into solution as illustrated in Fig. 1. As more solvent is used, more of the nitrocarboxylic acid is separated by the solvent. The separation depends upon the fact that the dicarboxylic acids and the nitrocarboxylic acid are polar substances and hence are relatively insoluble in the highly non-polar solvent, particularly when a hydrocarbon solvent is used. The ratio of solvent used to the amount of the non-polar phase extracted is quite critical and the solvent composition is more so. By using less solvent the process will follow the outline of Fig. 1. With more solvent, the process of Fig. 2 will be followed.

The nature and extent of the separation process is highly dependent on both the temperature of operation and the relative amount of extracting solvent used for the purpose. Broadly, addition of less than one part of the mixed hexanes, for example, to two parts by volume of the non-aqueous phase does not usually lead to significant formation of a second phase. Equivolume mixture of the solvent and the non-aqueous phase exhibits turbidity and on standing (especially with cooling) yields a solid precipitate composed largely of the dicarboxylic acid portion of the original mixture, as illustrated in Fig. 1. The supernatant liquor resulting from this separation, on further dilution with the hydrocarbon solvent yields a second liquid phase which contains nearly all of the nitrocarboxylic acid in the original mixture, the monocarboxylic acid remaining largely in solution at this point.

This method of Fig. 1 is dependent upon fractional precipitation of the more polar dicarboxylic acids from the less polar nitrocarboxylic acid by progressive dilution of the non-aqueous phase from the reactor with highly non-polar solvent such as mixed pentanes. This method, while more convenient than the procedure of Fig. 2, from the operational standpoint, does not yield as good a separation of the various classes of carboxylic acids from one another.

If more than two parts by volume of the hydrocarbon solvent are added to one part of the non-aqueous phase, the process follows Fig. 2. Two liquid phases are formed in which the upper phase is composed largely of the solvent, monocarboxylic acid and a small amount of the nitrocarboxylic acid; the lower phase being essentially a mixture of the dicarboxylic acids and the nitrocarboxylic acid.

As an example of the treatment of non-aqueous phase, after washing, this phase may be extracted with 200 parts of the non-polar solvent, as for example, mixed pentanes, per 100 parts of the non-aqueous phase. This mixture, including the solvent, is agitated for ten minutes at 25° C. It is then allowed to settle 20 minutes to permit the settling out of the more polar phase. The soluble phase is then separated from the remaining viscous oil. The heavy oil layer is advantageously separated from the monocarboxylic acid solution in non-polar solvent by drawing off the bottom layer to remove the dicarboxylic acids and nitrocarboxylic acid.

The non-polar solvent is then recovered from the monocarboxylic acid, preferably by flash-distillation, and recovered for reuse. The residue, consisting largely of monocarboxylic acids and containing only a small amount of nitrocarboxylic acid, is then distilled in a low-reflux-ratio distillation at, for example, 20-50 mm. mercury (total pressure) in a low pressure-drop column. This column should contain 25 or more theoretical plates. The residue will contain the higher molecular weight monocarboxylic acids together with the nitrocarboxylic acid which was not separated by the non-polar solvent.

The distillate from the foregoing operation will show 25% to 40% or more of monocarboxylic acid based upon the weight of dicarboxylic acid produced in the oxidation process. The foregoing distillation procedure is illustrative. Other procedures may be employed.

In the over-all process, the separation of nitrocarboxylic acid from the dicarboxylic acids fraction can be effected in several ways. In the case of the above example, following the process of Fig. 2, the nitrocarboxylic acid is obtained as a mixture with the dicarboxylic acids, which separates from the monocarboxylic acid solution as a heavy liquid phase. These two components can be separated readily by dissolving the total fraction with an equal volume of chloroform, an ether or other suitable semi-polar solvent and adding to this solution sufficient volume of the non-polar solvent (butane, pentanes, hexanes, etc.) to create a slightly turbid solution, and then cooling to substantially lower temperature. Temperatures below zero degrees centigrade are preferred for best yields. After several hours' period, the dicarboxylic acid fraction precipitates as fine powder from the cooled solution, leaving behind the nitrocarboxylic acid portion in solution. The latter fraction can be substantially freed from the non-polar solvent and from residual monocarboxylic acids present, by further diluting the solution with the non-polar solvent. The nitrocarboxylic acid, on addition of more such solvent, separates out in the form of a heavy liquid phase. If desired, this latter process can be facilitated by removal of the semi-polar solvent by distillation after precipitation of the dicarboxylic acid fraction and removal of same.

The following illustrate the analyses of different non-aqueous phase mixtures obtained by the oxidation of different source materials. Thus, for instance, the oxidation of red oil may give a non-aqueous phase of the following analysis:

| | Percent |
|---|---|
| Nitrocarboxylic acid | 23.0 |
| Dicarboxylic acids | 7.7 |
| Monocarboxylic acids | 64.3 |
| Water | 5.0 |

The nitrocarboxylic acid settled as an immiscible layer together with the dicarboxylic acids from the non-polar solvent solution. The monocarboxylic acids resulting from the separation in the non-polar solvent were partially analyzed chromatographically and this portion showed it to contain:

Table 2.—*Monocarboxylic acids secured from oxidation reactor*

| Monocarboxylic acid: | Percent |
|---|---|
| $C_{12}$ | Tr |
| $C_{11}$ | 6.07 |
| $C_{10}$ | 17.57 |
| $C_9$ | 12.75 |
| $C_8$ | 11.04 |
| $C_7$ to $C_4$, inclusive | 52.56 |
| | 100.00 |

The monocarboxylic acid volatilized from the oxidation which resulted in the dicarboxylic acids as shown in Table 1 was collected as part of the condensate thereof and was found to be 21% of the dicarboxylic acid produced. It had the following analysis:

Table 3.—*Monocarboxylic acids secured by volatilization*

| Carbon Number | Name | Percent by Fractionation and Refractive Index Method |
|---|---|---|
| $C_4$ | Butyric | 6.8 |
| $C_5$ | Valeric | 21.9 |
| $C_6$ | Caproic | 27.2 |
| $C_7$ | Oenanthic | 12.2 |
| $C_8$ | Caprylic | 16.2 |
| $C_9$ | Pelargonic | 11.1 |
| $C_{10}$ | Capric | 3.7 |
| $C_{11}$ | Hendecanoic | 0.9 |
| | | 100.0 |

21 to 25% of the weight of dicarboxylic acid produced represents the amount of monocarboxylic acids recoverable as volatilized material and as described by analysis given in Table 3. An equivalent amount (or more) is available from the non-aqueous phase monocarboxylic acids as shown by analysis under Table 2. If we allow 21% of each type of monocarboxylic acid as recoverable (based on the weight of dicarboxylic acid produced) we would have a monocarboxylic acid of the analysis given under Table 4.

Table 4.—*Monocarboxylic acid-basis 42% of weight of dicarboxylic acid produced*

| | Percent |
|---|---|
| $C_4$ to $C_7$ inclusive | 60.3 |
| $C_8$ | 13.6 |
| $C_9$ | 11.9 |
| $C_{10}$ | 10.6 |
| $C_{11}$ | 3.5 |
| $C_{12}$ | Tr |
| | 99.9 |

This process of oxidizing with nitric acid is unique, since with the other oxidizing methods only half of the oleic acid is converted to dicarboxylic acid and the other half remains as $C_9$ (pelargonic acid). This is true for the ozonization method of oxidation, the chromic acid method, and other such oxidation processes. Only the nitric acid process gives the complete homologous series of dicarboxylic acids $C_4$ to $C_{10}$, and the complete homologous series of monocarboxylic acids $C_4$ to $C_{12}$ inclusive, regardless of whether or not a saturated fatty acid such as stearic acid or a monoethanoic fatty acid such as oleic acid is employed. Oleic acid will produce monocarboxylic acids $C_4$ to $C_9$, with small amounts of $C_{10}$.

Thus all of the monocarboxylic acids which cannot be used effectively and economically can be fed back to the nitric acid oxidation process. In fact, we could oxidize pelargonic acid (and other monocarboxylic acids) produced as by-product materials from the ozonization oxidation process, the chromic acid oxidation process, and other related processes, and convert them into dicarboxylic acids of the same chain length or shorter chain lengths.

Hence, the nitric acid process is useful in its own right and as a companion process, to convert by-products of other oxidation processes to useful products.

The nitric acid oxidation process also permits of the production of large quantities of odd-carbon numbered carboxylic acids which are not available in nature or from any other source, such as $C_5$, $C_7$, $C_{11}$, etc. Pelargonic acid ($C_9$) is available from nitric acid oxidation process, as well as other oxidations of oleic acid.

Where pure monocarboxylic acids are required, the desired fraction may be converted to esters such as methyl or ethyl esters by any suitable process and then be redistilled to secure a monocarboxylic acid ester of the desired purity. This may be transesterified to the desired glyceryl, glycol, or higher alcohol-ester. The dicarboxylic acids and mono derivatives of carboxylic acids obtained on separation of the solution of monocarboxylic acids, may contain small amounts of inorganic salts from the previous wash treatments. These may be removed by suitable means.

The invention is not limited to specific examples or specific steps referred to herein. If the oxidation be carried out as a one-phase reaction, water may be added to the oxidized product, and the procedure described herein followed. The composition of the reacted mixture will depend upon the source material and the oxidizing agent employed, as well as its concentration, the extent to which the oxidation is carried, and the temperature and pressure under which the reaction takes place.

Although the invention has been described more particularly with respect to the separation of monocarboxylic acids, nitrocarboxylic acid and dicarboxylic acids, as found in particular fractions or cuts or mixtures thereof obtained by the oxidation of the source materials defined herein, it is to be understood that it is not limited thereto, but relates to the separation of these classes of acids from any and all mixtures thereof produced by the oxidation of such source materials.

The invention is defined in the claims which follow. What we claim is:

1. In the treatment of alpha, omega-alkanedioic acids, alkanoic acids and nitrocarboxylic acid present in the non-aqueous phase of the two-phase reaction product obtained in the oxidation by an aqueous oxidizing agent which includes nitric acid, of source material of the class which consists of saturated and unsaturated cylic and acyclic aliphatic hydrocarbons and oxygen-containing derivatives thereof which hydrocarbons and derivatives contain at least 4 carbon atoms in a straight saturated chain, the steps which comprise dissolving alkanoic acids from the non-aqueous phase with inert non-polar solvent, and then separating the solvent and non-aqueous phases.

2. In the treatment of alpha, omega-alkanedioic acids, alkanoic acids and nitrocarboxylic acid present in the non-aqueous phase of the two-phase reaction product obtained in the oxidation by an aqueous oxidizing agent which includes nitric acid, of source material of the class which consists of saturated and unsaturated cyclic and acyclic aliphatic hydrocarbons and oxygen-containing derivatives thereof which hydrocarbons and derivatives contain at least 4 carbon atoms in a straight saturated chain, the steps which comprise neutralizing said residual nitric acid therein with sulfite and removing alpha, omega-alkanedioic acids therefrom, adding inert non-polar solvent to the non-aqueous phase and dissolving most of the alkanoic acids while dissolving substantially none of said nitrocarboxylic acid and said alkanedioic acids, and then separating the solvent and non-aqueous phases.

3. The process of claim 2 in which the alpha, omega-alkanedioic acids are separated from admixture with the nitrocarboxylic acids by the addition of inert non-polar solvent thereto.

4. The method of separating nitrocarboxylic acid from alpha, omega-alkanedioic acids in solution in a semi-polar solvent, which comprises treating the mixture with inert non-polar solvent, and thereby precipitating the alkanedioic acids.

5. The process of separating alpha, omega-alkanedioic, alkanoic and nitrocarboxylic acids from a non-polar solution thereof, which comprises adding inert non-polar solvent to the solution and causing at least some of the alkanoic and nitrocarboxylic acids to dissolve into the solvent and at least most of the alkanedioic acids to separate therefrom, and then adding more non-polar solvent to mother liquor and causing it to form two phases one of which is essentially the nitrocarboxylic acids and the other of which is essentially said alkanoic acids in solution in the solvent.

6. In the treatment of alpha, omega-alkanedioic acids, alkanoic acids and nitrocarboxylic acid present in the non-aqueous phase of the two-phase reaction product obtained in the oxidation by an aqueous oxidizing agent which includes nitric acid, of source material of the class which consists of saturated and unsaturated cyclic and acyclic aliphatic hydrocarbons and oxygen-containing derivatives thereof, which hydrocarbon and derivatives contain at least 4 carbon atoms in a straight saturated chain, the steps which comprise dissolving the alkanoic acids from the non-aqueous phase by inert semi-polar solvent, separating the solvent and non-aqueous phases, and adding a non-polar solvent to the resultant non-aqueous phase containing alkanedioic acids and nitrocarboxylic acid and by cooling causing alkanedioic acids to separate therefrom.

7. In the treatment of alpha, omega-alkanedioic acids, alkanoic acids and nitrocarboxylic acid present in the non-aqueous phase of the two-phase reaction product obtained in the oxidation by an aqueous oxidizing agent which includes nitric acid, of source material of the class which consists of saturated and unsaturated cyclic and acyclic aliphatic hydrocarbons and oxygen-containing derivatives thereof, which hydrocarbon and derivatives contain at least 4 carbon atoms in a straight saturated chain, the steps which comprise adding inert non-polar solvent to the non-aqueous phase and thereby producing a two-phase liquid system in the upper phase of which said alkanoic acids are dissolved in said solvent, with the alkanedioic acids and the nitrocarboxylic acid in the lower phase, and then separating the solvent and non-aqueous phases.

8. In the treatment of alpha, omega-alkanedioic acids, alkanoic acids and nitrocarboxylic acid present in the non-aqueous phase of the two-phase reaction product obtained in the oxidation by an aqueous oxidizing agent which includes nitric acid, of source material of the class which consists of saturated and unsaturated cyclic and acyclic aliphatic hydrocarbons and oxygen-containing derivatives thereof, which hydrocarbon and derivatives contain at least 4 carbon atoms in a straight saturated chain, the steps which comprise adding inert non-polar solvent to said non-aqueous phase to cause the separation of the alkanedioic acids and produce a mother liquor in which at least most of said alkanoic and nitrocarboxylic acids are dissolved, and then adding non-polar solvent to the mother liquor to cause the separation thereof into two phases one of which contains essentially said alkanoic acids and the other of which contains essentially the nitrocarboxylic acid.

References Cited in the file of this patent

UNITED STATES PATENTS

| | | |
|---|---|---|
| 2,203,680 | Ellingboe | June 11, 1940 |
| 2,389,191 | Fitzpatrick et al. | Nov. 20, 1945 |
| 2,426,954 | Sprules et al. | Sept. 2, 1947 |
| 2,560,156 | Cavanaugh et al. | July 10, 1951 |
| 2,606,890 | Polly et al. | Aug. 12, 1952 |
| 2,614,122 | Mikeska | Oct. 14, 1952 |
| 2,716,133 | Pooler | Aug. 23, 1955 |